United States Patent [19]

Etoh et al.

[11] 4,320,726
[45] Mar. 23, 1982

[54] INTERNAL COMBUSTION ENGINE

[75] Inventors: Yukihiro Etoh, Yokohama; Toshiaki Tanaka, Fujisawa, both of Japan

[73] Assignee: Nissan Motor Company, Limited, Yokohama, Japan

[21] Appl. No.: 130,067

[22] Filed: Mar. 13, 1980

[30] Foreign Application Priority Data

Mar. 16, 1979 [JP] Japan .................. 54-30729

[51] Int. Cl.³ .............................. F02B 77/00
[52] U.S. Cl. .................. 123/198 F; 123/571
[58] Field of Search .............. 123/571, 198 F

[56] References Cited

U.S. PATENT DOCUMENTS 4,080,947 3/1978 Iizuka ............... 123/198 F

FOREIGN PATENT DOCUMENTS

| | | |
|---|---|---|
| 2357410 | 8/1977 | Fed. Rep. of Germany . |
| 2633617 | 2/1978 | Fed. Rep. of Germany . |
| 55-51926 | 4/1980 | Japan ............... 123/198 F |
| 55-128633 | 4/1980 | Japan ............... 123/198 F |
| 55-128634 | 4/1980 | Japan ............... 123/198 F |
| 55-66637 | 5/1980 | Japan ............... 123/198 F |
| 55-78136 | 12/1980 | Japan ............... 123/198 F |
| 1519184 | 7/1978 | United Kingdom . |

*Primary Examiner*—Ronald B. Cox
*Attorney, Agent, or Firm*—Schwartz, Jeffery, Schwaab, Mack, Blumenthal & Koch

[57] ABSTRACT

An internal combustion engine is disclosed which includes active cylinders being always active and inactive cylinders being inactive when the engine load is below a predetermined value. The engine has an intake passage divided into first and second branches connected to active and inactive cylinders, respectively. The second branch is provided near its inlet with a stop valve and is connected through an EGR valve to the engine exhaust passage and also through an air valve to air source. A sensor is located in the exhaust passage for providing a feedback signal to ensure that the fuel supplied to the engine is maintained at a desired air/fuel ratio. Control means is provided to close the stop valve, open the EGR valve, and cut off the flow of fuel for the inactive cylinders. Means is provided to close the EGR valve, open the air valve, and determined the amount of fuel to the engine regardless of the feedback signal from the sensor under extremely low load conditions.

6 Claims, 5 Drawing Figures

INTERNAL COMBUSTION ENGINE

BACKGROUND OF THE INVENTION

1. Field of the Invention

This invention relates to an internal combustion engine of the split type including active cylinders being always active and inactive cylinders being inactive below a given engine load and, more particularly, to such an internal combustion engine associated with an air/fuel ratio sensor adapted to provide a feedback signal for maintaining the air/fuel ratio of the mixture in each cylinder at the stoichiometric value.

2. Description of the Prior Art

It is generally known that internal combustion engines demonstrate higher fuel combustion and thus higher fuel economy when running under higher load conditions. In view of this fact, split type internal combustion engines have already been proposed as automotive vehicle engines or the like subjective to frequent engine load variations. Such split type internal combustion engines include active cylinders being always active and inactive cylinders being inactive when the engine load is below a given value. During low load conditions, the flow of fuel and air to the inactive cylinders is cut off so that the engine operates only on the active cylinders for relatively increased active cylinder loads resulting in high fuel economy.

A split type internal combustion engine has been proposed which is associated with an exhaust gas recirculation system for re-introduction of a great amount of exhaust gases into the inactive cylinders to minimize inactive cylinder pumping losses during a split engine operation and also with an air/fuel ratio sensor adapted to provide a feedback signal for maintaining the air/fuel ratio of the mixture in each cylinder at the stoichiometric value. Such a split type internal combustion engine exhibits much higher fuel economy.

One difficulty with such conventional split type internal combustion engine is the possibility of leakage of the re-introduced exhaust gases from the inactive cylinders to the active cylinders, which results in unstable active cylinder operation. Although an attempt has been made to introduce air into the inactive cylinders during a split engine operation, it causes the air/fuel ratio sensor to provide an inaccurate feedback signal.

SUMMARY OF THE INVENTION

It is therefore one object of the present invention to provide an improved split type internal combustion engine which is free from the above described disadvantages found in conventional engines.

Another object of the present invention is to provide a split type internal combustion engine of the character described which is stable in operation particularly during a split engine operation.

Still another object of the present invention is to provide a split type internal combustion engine of the character described which is high in fuel economy, engine output and exhaust gas purifying performance.

BRIEF DESCRIPTION OF THE DRAWINGS

The present invention will be described in greater detail by reference to the following description taken in connection with the accompanying drawings, in which.

DESCRIPTION OF THE PREFERRED EMBODIMENTS

Figure 1:
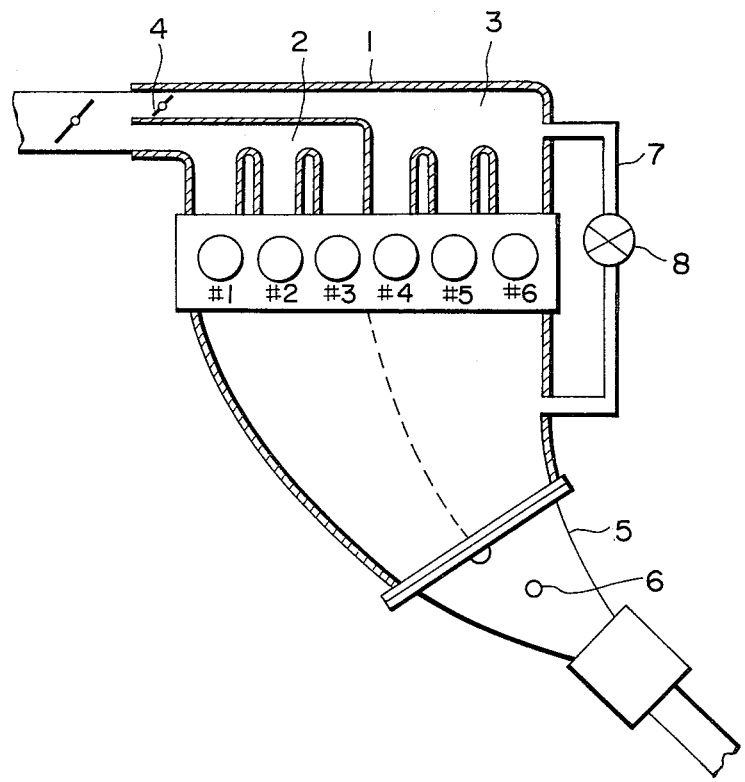
FIG. 1 is a schematic sectional view showing a prior art split type internal combustion engine.

Prior to the description of the preferred embodiment of the present invention, we shall briefly describe the prior art split type internal combustion engine in FIG. 1 in order to specifically point out the difficulties attendant thereon.

Referring to FIG. 1, the split engine includes active cylinders #1 to #3 being always active and inactive cylinders #4 to #6 being inactive when the engine load falls below a predetermined value. Air is introduced through an intake manifold 1 of the divided header type having first and second separated intake passages 2 and 3. The first intake passage 2 is for supplying air to the active cylinders #1 to #3 and the second intake passage 3 is for supplying air to the inactive cylinders #4 to #6. The second intake passage 3 has therein a stop valve 4 adapted to close so as to cut off the flow of air to the inactive cylinders #4 to #6 during a three cylinder mode of operation. The engine has also an exhaust passage 5 provided therein with an air/fuel ratio sensor 6. An exhaust gas recirculation (EGR) passage 7 is provided which has its one end opening into the exhaust passage 5 and the other end opening into the second intake passage 3. The EGR passage 7 has therein an EGR valve 8 adapted to open so as to allow re-introduction of exhaust gases into the second intake passage 3 during a three cylinder mode of operation.

At low load conditions, the stop valve 4 closes to shut off the flow of air to the inactive cylinders #4 to #6 and the EGR valve 8 opens to re-introduce a great amount of exhaust gases into the second intake passage 3. With the stop valve 4 being poor in fluid-sealability, there is the possibility of leakage of the exhaust gases charged in the second intake passage 3 into the first intake passage 2 to spoil the operation of the active cylinders due to a great pressure differential across the stop valve 4. If air, instead of exhaust gases, is introduced into the second intake passage 3 to minimize the inactive cylinder pumping losses during a three cylinder mode of operation, the air will flow over the air/fuel ratio sensor 6, causing inaccuracy of the detection of the air/fuel ratio of the mixture charged in the active cylinders #1 to #3.

Figure 2:
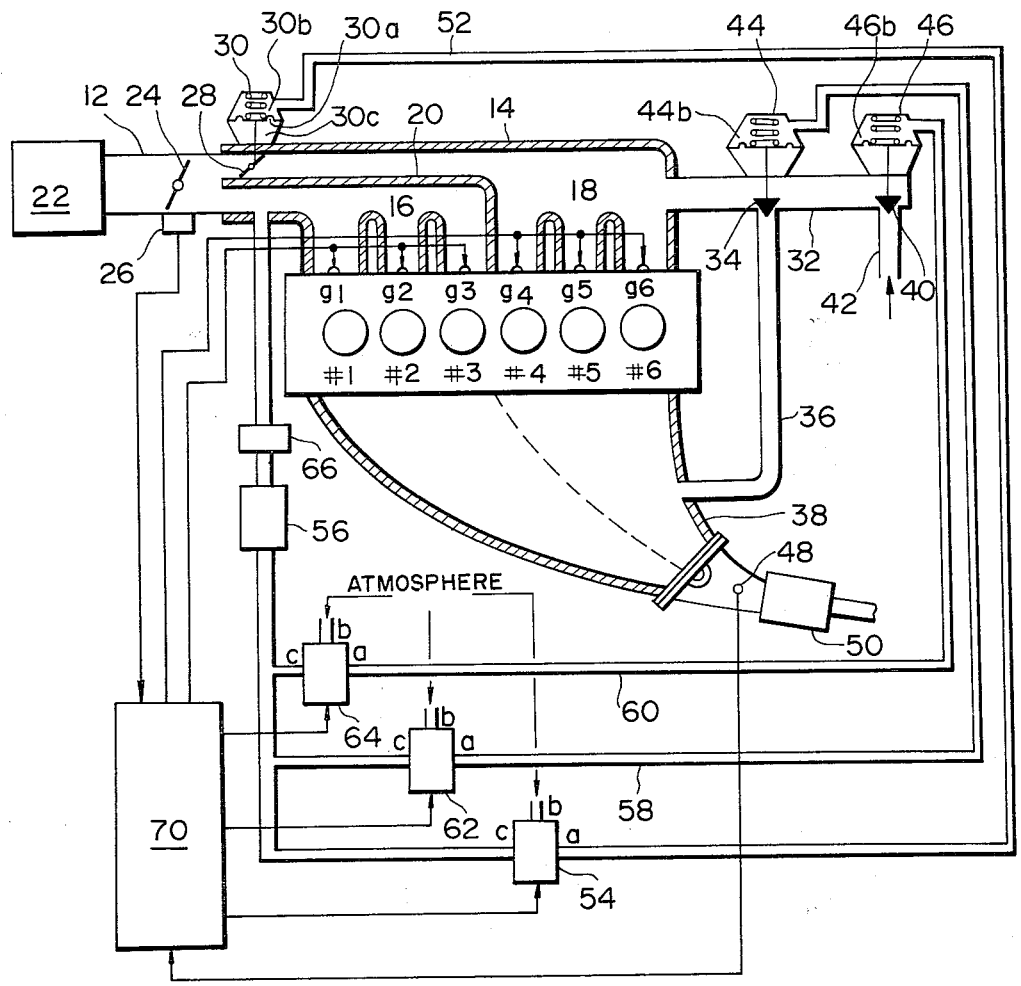
FIG. 2 is a schematic sectional view showing one embodiment of a split type internal combustion engine made in accordance with the present invention.

Referring to FIG. 2, there is illustrated one preferred embodiment of an internal combustion engine constructed in accordance with the present invention. The engine is of the split type including six cylinders #1 to #6, the first three cylinders #1 to #3 being always "active" and referred to as active cylinders while the other three cylinders #4 to #6 being "inactive" below a predetermined engine load and referred to as inactive cylinders. Although the engine shown is a six cylinder engine, it is to be noted that the particular engine shown is only for illustrative purposes and the structure of this invention could be readily applied to any engine structure.

Air to the engine is supplied through an air induction passage 12 to an intake manifold 14 of the divider header type having individual air intake passages 16 to 18 separated by an partition 20. The first intake passage 16 is for supplying air to each of the active cylinders #1 to #3 and the second intake passage 18 is for supplying air to each of the inactive #4 to #6. The air indication passage 12 is provided therein with an air flow meter 22 and an air metering throttle valve 24. A throttle position switch 26 is provided for detecting the fully closed position of the throttle valve 24. The second intake passage 18 is provided therein with a stop valve 28 at a position just downstream of its inlet opening. The stop valve 28 is adapted to close so as to cut off communication between the first and second intake passages 16 and 18. The opening and closing of the air valve 24 is effected by a pneumatic valve actuator 30 as will be described in detail.

The second passage 18 is connected at its downstream side to a passage 32, which in turn is connected through an exhaust gas recirculation (EGR) valve 34 to an EGR passage 36 leading to the engine exhaust system 38 and also through an air valve 40 to an air passage 42. The opening and closing of the EGR valve 34 and air valve 40 is effected by second and third pneumatic valve actuators 44 and 46, respectively.

The exhaust system 38 is provided therein with an air/fuel ratio sensor 48 such for example as an oxygen sensor to provide a feedback signal for ensuring that the fuel supplied to the engine is correct to maintain a desired optimum air/fuel ratio, e.g., the stoichiometric air/fuel ratio. The exhaust system 38 has therein a three-way catalytic converter 50 located at a position downstream of the air/fuel ratio sensor 48 to effect oxidation of HC and CO and reduction of NOx so as to minimize the emission of pollutants through the exhaust system. The catalytic converter offers its maximum performance at the stoichiometric air/fuel ratio.

The first pneumatic valve actuator 30 includes a flexible diaphragm 30a mounted between a pair of housings to form therewith chambers 30b and 30c on opposite sides of the diaphragm 30a. A rod is centrally fixed to the diaphragm 30a and extends through the opening in the chamber 30c to the stop valve 28. A spring is disposed in the working chamber 30b to bias the diaphragm 30a downwardly. The working chamber 30b is connected by a conduit 52 to the outlet 54a of a first three-way solenoid valve 54. The solenoid valve 54 has an atmosphere inlet 54b connected to the atmospheric air and a vacuum inlet 54c communicating with a vacuum tank 56. The second and third pneumatic valve actuators 44 and 46 associated with the EGR valve 34 and air valve 40, respectively, are substantially similar in structure to the first pneumatic valve actuator 30. The working chambers 44b and 46b of the second and third valve actuators 44 and 46 are communicated through conduits 58 and 60 with the inlets 62a and 64a of second and third three-way solenoid valves 62 and 64, respectively. The second solenoid valve 62 has an atmosphere inlet 62b connected to the atmospheric air and a vacuum inlet 62c communicated with the vacuum tank 56. The third solenoid valve 64 has an atmosphere inlet 64b connected to the atmospheric air and a vacuum inlet 64c communicating with the vacuum tank 56. The vacuum tank 56 is connected through a check valve 66 to the second cylinder intake passage 16.

The solenoid valves 54, 62 and 64 are responsive to a high input to establish communication between their vacuum inlets c and their outlets a and are responsive to a low input to provide communication between their atmosphere inlets b and their outlets a. The operation of the three-way solenoid valves 54, 62 and 64 are controlled by a control system 70.

Figure 3:
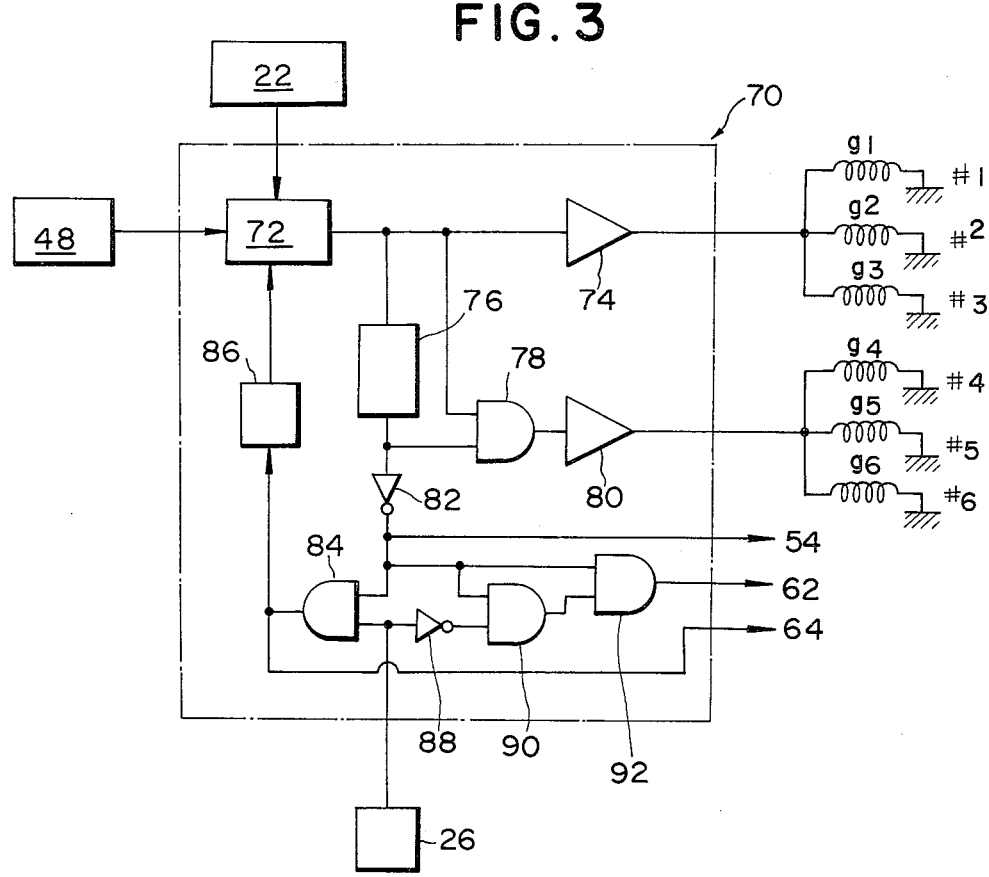
FIG. 3 is a circuit diagram showing the control system used in the split engine of FIG. 2.

Referring to FIG. 3, the control system 70 has inputs from the air/fuel ratio sensor 48, the air flow meter 22, and the throttle position switch 26 for providing control signals to the solenoid valves 54, 62 and 64 and also fuel injection signals to the fuel injection valves $g_1$ to $g_6$ for the respective cylinders #1 to #6. The throttle position switch 26 is adapted to provide a high signal at the fully closed position of the throttle valve 24 and a low signal at the other throttle positions.

The control system 70 includes a fuel injection control circuit 72 adapted to provide, in synchronism with rotation of the engine, a fuel injection signal to the fuel injection valves $g_1$ to $g_6$ for the respective cylinders #1 to #6. The pulse width of the fuel injection signal is maintained at a desired level sufficient for stable engine operation at the fully closed position of the throttle valve 24 while it is mainly determined by the amount of air introduced to the engine or any other engine load representive factor and modified in accordance with the feedback signal from the air/fuel ratio sensor 48 so that the fuel supplied to the engine can be maintained at the stoichiometric air/fuel ratio at the other open throttle position. It is to be noted that the pulse width of the fuel injection signal is controlled in accordance with the intake air flow rate or any other suitable engine load representative factor independently of the feedback signal from the air/fuel ratio sensor when the throttle valve is at its fully closed position.

The output of the fuel injection control circuit 72 is coupled through an amplifier 74 to the fuel injection valves $g_1$ to $g_3$ for the respective active cylinders #1 to #3 and also to a load detector 76. The load detector 76 is responsive to the pulse width of the fuel injection signal, which represents the engine load, for providing a low signal at low load conditions and a high signal when the engine load exceeds a predetermined value. The output of the load detector 76 is connected to one input of an AND circuit 78, the other input of which is coupled to the output of the fuel injection control circuit 72. The AND circuit 78 is responsive to a high output of the load detector 76 for passing the fuel injection signal through an amplifier 80 to the fuel injection valves $g_4$ to $g_6$ for the respective inactive cylinders #4 to #6 and is responsive to a low output of the load detector 76 for shutting off the supply of the fuel injection signal to the fuel injection valve $g_4$ to $g_6$. The amplifiers 74 and 80 should have an amplification factor sufficient to permit the fuel injection valves to be driven with the fuel injection signal.

The output of the load detector 76 is coupled to an inverter 82 which in turn is connected to the first solenoid valve 54 and also to one input of an AND circuit 84, the other input of which is connected to the throttle position switch 26. The output of the AND circuit 84 is connected through a delay circuit 86 to the fuel injection control circuit 72. The AND circuit 84 provides a high output to cause a first mode of operation of the fuel injection control circuit 72 so as to maintain the fuel injection signal pulse width at the desired value only when the engine is under low load conditions and the throttle valve 24 is fully closed. Under the other conditions, the AND circuit 84 provides a low output to cause a second mode of operation of the fuel injection control circuit 72 so as to determine the pulse width of the fuel injection signal in accordance with the outputs of the air flow meter 22 and air/fuel ratio sensor 48. The change between the first and second modes of operation of the fuel injection control circuit 72 is delayed a time determined by the delay circuit 86. The output of the AND circuit 84 is also applied to the third solenoid valve 64.

The output of the throttle position switch 26 is also coupled through an inverter 88 to one input of an AND circuit 90, the other input of which is connected to the output of the inverter 82. The output of the AND circuit 90 is connected to one input of an AND circuit 92 having the other input thereof coupled to the output of the inverter 82. The output of the AND circuit 92 is coupled to the second solenoid valve 62. The AND circuit 92 provides a high output only when the engine is at low load conditions and the throttle valve 24 is not at the fully closed position.

At high loads above the value predetermined in the load detector 76, the load detector 76 provides a high output to allow the passage of the fuel injection signal from the fuel injection control circuit 72 through and AND circuit 78 to the fuel injection valves $g_4$ to $g_6$. The low output of the inverter 82 is coupled to the first solenoid valve 54, which provides communication between its atmosphere inlet 54b and the outlet 54a to introduce atmospheric pressure to the working chamber 30b of the first valve actuator 30. This causes the stop valve 28 to open, allowing the air flow to the inactive cylinders #3 to #6.

In this state, the throttle valve 24 is open and the throttle position switch 26 provides a low output. Due to the low output of the inverter 82 and the low output of the throttle position switch 26, the AND circuit 92 provides a low output and also the AND circuit 84 provides a low output. The low output of the AND circuit 92 is applied to the second solenoid valve 62 to provide communication between its atmosphere inlet 62b and its outlet 62a so that atmospheric pressure is introduced to the working chamber 44b of the second valve actuator 44 to close the EGR valve 34. The low output of the AND circuit 84 is coupled to the third solenoid valve 64 to establish communication between its atmosphere inlet 64b and its outlet 64a so that atmospheric pressure is introduced to the working chamber 46b of the third valve actuator 46 to close the air valve 40. Furthermore, the low output of the AND circuit 84 is applied through the delay circuit 86 to the fuel injection control circuit 72 so that the pulse width of the fuel injection signal is controlled in accordance with the feedback signal from the air/fuel ratio sensor 48 to maintain the mixture at the stoichiometric air/fuel ratio.

Accordingly, under high load conditions, the engine operates in a six cylinder mode with all of the engine cylinders supplied with fuel and air. The air/fuel ratio of the mixture in each cylinder is controlled in accordance with the feedback signal from the air/fuel ratio sensor 48 to maintain the stoichiometric valve so as to maximize the engine efficiency and minimize the emission of pollutants through the engine exhaust system.

When the engine load falls below the predetermined value but the throttle valve 24 is still open, the output of the load detector 76 changes to its low level. This cause the AND circuit 78 to cut off the flow of the fuel injection signal to the fuel injection valves $g_4$ to $g_6$. The output of the inverter 82 changes to its high level which is applied to the first solenoid valve 54 so as to establish communication between its vacuum inlet 54c and its outlet 54a. As a result, a high vacuum is introduced from the vacuum tank 56 to the working chamber 30b of the first valve actuator 30 to close the stop valve 28 to cut off the air flow to the inactive cylinders #4 to #6.

Since the throttle valve 24 is still open and the output of the throttle position switch 26 remains high, the AND circuit 84 provides a low output while the AND circuit 92 provides a high output. The high output of the AND circuit 92 is coupled to the second solenoid valve 62 to communicate its vacuum inlet 62c with its outlet 62a so that a high vacuum is introduced to the working chamber 44b of the second valve actuator 44, allowing exhaust gas recirculation into the second intake passage 18. The low output of the AND circuit 84 is applied to the third solenoid valve 64 to remain communication between its atmosphere inlet 64b and its outlet 64a so that atmospheric pressure is introduced to the working chamber 46b of the third valve actuator 46 to close the air valve 40. In addition, the low output of the AND circuit 84 is applied through the delay circuit 86 to the fuel injection control circuit 72 so that the pulse width of the fuel injection signal to the fuel ignition valves $g_1$ to $g_3$ is controlled in accordance with the feedback signal from the air/fuel ratio sensor 48 to maintain the stoichiometric air/fuel ratio in each of the active cylinders #1 to #3.

Accordingly, under high load conditions but at open throttle positions, the engine operates in a three cylinder mode where fuel and air is supplied to only the three active cylinders to increase the loads on the active cylinders resulting in higher fuel economy and exhaust gases are reintroduced into the second intake passage associated with the inactive cylinders to reduce pumping losses in the inactive cylinders resulting in much higher fuel economy. Since the throttle valve 24 is not fully closed, the difference between first and second intake passage pressure is relatively small. Thus, there is no possibility of leakage of exhaust gases through the stop valve 28 from the second intake passage 18 to the first intake passage 16. The air/fuel ratio of the mixture in each of the active cylinder is controlled in accordance with the feedback signal from the air/fuel ratio sensor to maintain the stoichiometric value. This can maximize the engine efficiency and minimize the emission of the pollutants through the engine exhaust system.

If the throttle valve 24 closes at low load conditions, the output of the load detector 76 is held low and the output of the throttle position switch 26 changes to its high level. The AND circuit 78 is responsive to the low output of the load detector 76 to shut off the flow of fuel injection signal to the fuel injection valves $g_4$ to $g_6$. The high output of the inverter 82 is applied to the first solenoid valve 54 to provide communication between its vacuum inlet 54c and its outlet 54a so that a high vacuum is communicated with the working chamber 30b of the first valve actuator 30 to close the stop valve 28 to shut off the air flow to the inactive cylinders #4 to #6.

Since the output of the throttle position switch 26 changes to its high level, the AND circuit 92 provides a low output and the AND circuit 84 provides a high signal. The low output of the AND circuit 92 is applied to the second solenoid valve 62 to establish communication between its atmosphere inlet 62b and its outlet 62a so that atmospheric pressure is introduced to the working chamber 44b of the second valve actuator 44 to close the EGR valve 34. The high output of the AND circuit 84 is applied to the third solenoid valve 64 to provide communication between its vacuum inlet 64c and its outlet 64a so that a high vacuum is introduced to the working chamber 46b of the third valve actuator 46 to open the air valve 40, allowing introduction of air into the second intake passage 18 associated with the inactive cylinders #4 to #6. The high output of the AND circuit 84 is also applied through the delay circuit 86 to the fuel injection control circuit 72 so that the pulse width of the fuel injection signal is maintained at a desired value predetermined in the fuel injection control circuit 72 regardless of the feedback signal from the air/fuel ratio sensor 48. This mode of operation of the fuel injection control circuit 72 occurs a time, determined in the delay circuit 86, after the output of the AND circuit 84 changes to its high level.

Accordingly, at the fully closed throttle position, the engine operates in a three cylinder mode where fuel and air is supplied to only the three active cylinders to increase the loads on the active cylinders resulting in higher fuel economy and air is introduced into the second intake passage associated with the inactive cylinders to reduce pumping losses in the inactive cylinders resulting in much higher fuel economy. Since the throttle valve 24 is fully closed and a great difference occurs between the first and second intake passage pressures, there is the possibility of leakage of air through the stop valve 28 from the second intake passage 18 to the first intake passage 16. However, the air escaping through the stop valve 28 has no adverse effect on the operation of the active cylinders #1 to #3.

Although the introduction of a great amount of air into the inactive cylinders #4 to #6 renders it impossible to detect the air/fuel ratio of the mixture charged in the active cylinders #1 to #3 by means of the air/fuel ratio sensor 48, there is no problem since the output of the throttle position switch 26 changes to its high level to place the fuel injection control circuit 72 in a mode of operation where the fuel supplied to the active cylinders #1 to #3 is determined without the feedback control of the air/fuel ratio sensor 92.

Figure 4:
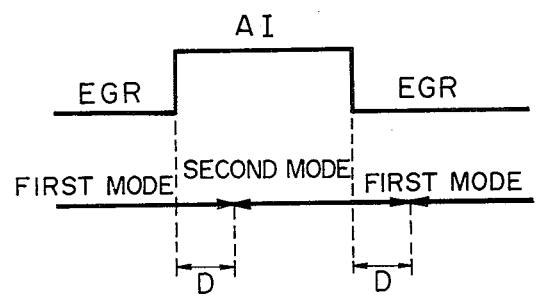
FIG. 4 is a diagram showing the function of the delay circuit of the control system of FIG. 3.

FIG. 4 is a diagram showing the function of the delay circuit 86, where the character EGR designates the duration of re-introduction of exhaust gases into the second intake passage 18 and the character AI the duration of introduction of air thereinto.

As set forth above, the fuel injection control circuit 72 operates in its first mode where the air/fuel ratio of the mixture in each cylinder is controlled to satisfy the stoichiometric value in accordance with the feedback signal from the air/fuel ratio sensor 48 at open throttle conditions, whereas it operates in its second mode where the air/fuel ratio thereof is controlled to a desired value regardless of the feedback signal from the air/fuel ratio sensor 48 at the fully closed position of the throttle valve 24. The delay circuit 86 delays a time D the change between the first and second modes of fuel-/air ratio control operation of the fuel injection control circuit 72. The reason for this is that the air/fuel ratio sensor 48 continuously provides a correct feedback signal to the fuel injection control circuit 72 during a period of time between the start of opening of the air valve 40 and the arrival of the introduced air at the air/fuel ratio sensor 48, while it continuously provides an incorrect feedback signal to the fuel injection control circuit 72 a time after the start of closing of the air valve 40.

Figure 5:
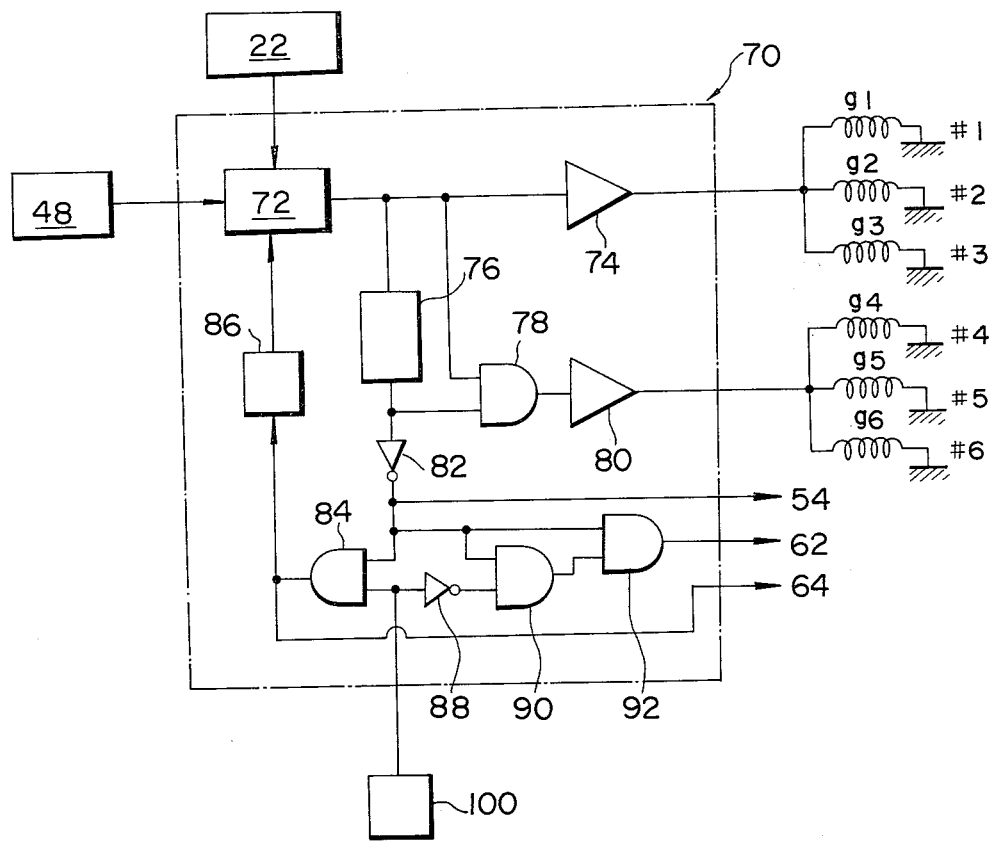
FIG. 5 is a circuit diagram showing an alternative form of the control system of the present invention.

Referring to FIG. 5, there is illustrated an alternative embodiment of the present invention, which is substantially similar to the first embodiment of FIGS. 2 and 3 except that the throttle position switch 26 is eliminated and replaced with a load sensor 100 adapted to provide a low signal at low loads and a high signal when the engine load exceeds a given extremely low value. The output of the load sensor 100 is coupled to one input of the AND circuit 84 and also coupled to the input of the inverter 88. The operation of this embodiment is identical with that of the first embodiment and will not be described further.

In view of the foregoing, it is apparent that there has been provided, in accordance with the present invention, an improved split type internal combustion engine which is stable in operation particularly during a split engine operation and high in fuel economy, engine output and exhaust gas purifying performance. If the throttle valve is fully closed during a split engine operation, air is introduced into the inactive cylinders to minimize the pumping losses therein and the fuel supplied to the active cylinders is controlled to a value sufficient for stable engine operation regardless of the feedback signal from the air/fuel ratio sensor. While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An internal combustion engine comprising:
(a) a plurality of cylinders split into first and second groups;
(b) first and second fuel injection means for supplying fuel into said first and second groups of cylinders, respectively;
(c) an air intake passage provided therein with an air metering throttle valve and divided downstream of said throttle valve into first and second branches for supplying air to said first and second groups of cylinders, respectively, said second intake passage branch provided near its inlet with a stop valve normally open to allow the flow of air into said second group of cylinders;
(d) an exhaust passage through which exhaust gases are discharged from said cylinders to the atmosphere;
(e) an EGR passage having its one end opening into said exhaust passage and the other end opening into said second intake passage branch, said EGR passage having therein an EGR valve normally closed to interrupt recirculation of exhaust gases into said second intake passage branch;
(f) an air introduction passage having its one end connected to an air source and the other end opening into said second intake passage branch, said air introduction passage having therein an air valve normally closed to interrupt the flow of air thereinto;
(g) an air/fuel ratio sensor for monitoring the air/fuel ratio at which said engine is operating;
(h) signal generating means for providing, in synchronism with rotation of said engine, a fuel injection signal to said first and second fuel injection means, said signal generating means adapted to operate normally in a first mode to determine the pulse width of the fuel injection signal in response to engine load and said air/fuel ratio sensor and in a of the air flow meter 22 and air/fuel ratio sensor 48. The change between the first and second modes of operation of the fuel injection control circuit 72 is delayed a time determined by the delay circuit 86. The output of the AND circuit 84 is also applied to the third solenoid valve 64.

The output of the throttle position switch 26 is also coupled through an inverter 88 to one input of an AND circuit 90, the other input of which is connected to the output of the inverter 82. The output of the AND circuit 90 is connected to one input of an AND circuit 92 having the other input thereof coupled to the output of the inverter 82. The output of the AND circuit 92 is coupled to the second solenoid valve 62. The AND circuit 92 provides a high output only when the engine is at low load conditions and the throttle valve 24 is not at the fully closed position.

At high loads above the value predetermined in the load detector 76, the load detector 76 provides a high output to allow the passage of the fuel injection signal from the fuel injection control circuit 72 through and AND circuit 78 to the fuel injection valves $g_4$ to $g_6$. The low output of the inverter 82 is coupled to the first solenoid valve 54, which provides communication between its atmosphere inlet 54b and the outlet 54a to introduce atmospheric pressure to the working chamber 30b of the first valve actuator 30. This causes the stop valve 28 to open, allowing the air flow to the inactive cylinders #3 to #6.

In this state, the throttle valve 24 is open and the throttle position switch 26 provides a low output. Due to the low output of the inverter 82 and the low output of the throttle position switch 26, the AND circuit 92 provides a low output and also the AND circuit 84 provides a low output. The low output of the AND circuit 92 is applied to the second solenoid valve 62 to provide communication between its atmosphere inlet 62b and its outlet 62a so that atmospheric pressure is introduced to the working chamber 44b of the second valve actuator 44 to close the EGR valve 34. The low output of the AND circuit 84 is coupled to the third solenoid valve 64 to establish communication between its atmosphere inlet 64b and its outlet 64a so that atmospheric pressure is introduced to the working chamber 46b of the third valve actuator 46 to close the air valve 40. Furthermore, the low output of the AND circuit 84 is applied through the delay circuit 86 to the fuel injection control circuit 72 so that the pulse width of the fuel injection signal is controlled in accordance with the feedback signal from the air/fuel ratio sensor 48 to maintain the mixture at the stoichiometric air/fuel ratio.

Accordingly, under high load conditions, the engine operates in a six cylinder mode with all of the engine cylinders supplied with fuel and air. The air/fuel ratio of the mixture in each cylinder is controlled in accordance with the feedback signal from the air/fuel ratio sensor 48 to maintain the stoichiometric valve so as to maximize the engine efficiency and minimize the emission of pollutants through the engine exhaust system.

When the engine load falls below the predetermined value but the throttle valve 24 is still open, the output of the load detector 76 changes to its low level. This cause the AND circuit 78 to cut off the flow of the fuel injection signal to the fuel injection valves $g_4$ to $g_6$. The output of the inverter 82 changes to its high level which is applied to the first solenoid valve 54 so as to establish communication between its vacuum inlet 54c and its outlet 54a. As a result, a high vacuum is introduced from the vacuum tank 56 to the working chamber 30b of the first valve actuator 30 to close the stop valve 28 to cut off the air flow to the inactive cylinders #4 to #6.

Since the throttle valve 24 is still open and the output of the throttle position switch 26 remains high, the AND circuit 84 provides a low output while the AND circuit 92 provides a high output. The high output of the AND circuit 92 is coupled to the second solenoid valve 62 to communicate its vacuum inlet 62c with its outlet 62a so that a high vacuum is introduced to the working chamber 44b of the second valve actuator 44, allowing exhaust gas recirculation into the second intake passage 18. The low output of the AND circuit 84 is applied to the third solenoid valve 64 to remain communication between its atmosphere inlet 64b and its outlet 64a so that atmospheric pressure is introduced to the working chamber 46b of the third valve actuator 46 to close the air valve 40. In addition, the low output of the AND circuit 84 is applied through the delay circuit 86 to the fuel injection control circuit 72 so that the pulse width of the fuel injection signal to the fuel ignition valves $g_1$ to $g_3$ is controlled in accordance with the feedback signal from the air/fuel ratio sensor 48 to maintain the stoichiometric air/fuel ratio in each of the active cylinders #1 to #3.

Accordingly, under high load conditions but at open throttle positions, the engine operates in a three cylinder mode where fuel and air is supplied to only the three active cylinders to increase the loads on the active cylinders resulting in higher fuel economy and exhaust gases are reintroduced into the second intake passage associated with the inactive cylinders to reduce pumping losses in the inactive cylinders resulting in much higher fuel economy. Since the throttle valve 24 is not fully closed, the difference between first and second intake passage pressure is relatively small. Thus, there is no possibility of leakage of exhaust gases through the stop valve 28 from the second intake passage 18 to the first intake passage 16. The air/fuel ratio of the mixture in each of the active cylinder is controlled in accordance with the feedback signal from the air/fuel ratio sensor to maintain the stoichiometric value. This can maximize the engine efficiency and minimize the emission of the pollutants through the engine exhaust system.

If the throttle valve 24 closes at low load conditions, the output of the load detector 76 is held low and the output of the throttle position switch 26 changes to its high level. The AND circuit 78 is responsive to the low output of the load detector 76 to shut off the flow of fuel injection signal to the fuel injection valves $g_4$ to $g_6$. The high output of the inverter 82 is applied to the first solenoid valve 54 to provide communication between its vacuum inlet 54c and its outlet 54a so that a high vacuum is communicated with the working chamber 30b of the first valve actuator 30 to close the stop valve 28 to shut off the air flow to the inactive cylinders #4 to #6.

Since the output of the throttle position switch 26 changes to its high level, the AND circuit 92 provides a low output and the AND circuit 84 provides a high signal. The low output of the AND circuit 92 is applied to the second solenoid valve 62 to establish communication between its atmosphere inlet 62b and its outlet 62a so that atmospheric pressure is introduced to the working chamber 44b of the second valve actuator 44 to close the EGR valve 34. The high output of the AND circuit 84 is applied to the third solenoid valve 64 to provide communication between its vacuum inlet 64c and its outlet 64a so that a high vacuum is introduced to the working chamber 46b of the third valve actuator 46 to open the air valve 40, allowing introduction of air into the second intake passage 18 associated with the inactive cylinders #4 to #6. The high output of the AND circuit 84 is also applied through the delay circuit 86 to the fuel injection control circuit 72 so that the pulse width of the fuel injection signal is maintained at a desired value predetermined in the fuel injection control circuit 72 regardless of the feedback signal from the air/fuel ratio sensor 48. This mode of operation of the fuel injection control circuit 72 occurs a time, determined in the delay circuit 86, after the output of the AND circuit 84 changes to its high level.

Accordingly, at the fully closed throttle position, the engine operates in a three cylinder mode where fuel and air is supplied to only the three active cylinders to increase the loads on the active cylinders resulting in higher fuel economy and air is introduced into the second intake passage associated with the inactive cylinders to reduce pumping losses in the inactive cylinders resulting in much higher fuel economy. Since the throttle valve 24 is fully closed and a great difference occurs between the first and second intake passage pressures, there is the possibility of leakage of air through the stop valve 28 from the second intake passage 18 to the first intake passage 16. However, the air escaping through the stop valve 28 has no adverse effect on the operation of the active cylinders #1 to #3.

Although the introduction of a great amount of air into the inactive cylinders #4 to #6 renders it impossible to detect the air/fuel ratio of the mixture charged in the active cylinders #1 to #3 by means of the air/fuel ratio sensor 48, there is no problem since the output of the throttle position switch 26 changes to its high level to place the fuel injection control circuit 72 in a mode of operation where the fuel supplied to the active cylinders #1 to #3 is determined without the feedback control of the air/fuel ratio sensor 92.

FIG. 4 is a diagram showing the function of the delay circuit 86, where the character EGR designates the duration of re-introduction of exhaust gases into the second intake passage 18 and the character AI the duration of introduction of air thereinto.

As set forth above, the fuel injection control circuit 72 operates in its first mode where the air/fuel ratio of the mixture in each cylinder is controlled to satisfy the stoichiometric value in accordance with the feedback signal from the air/fuel ratio sensor 48 at open throttle conditions, whereas it operates in its second mode where the air/fuel ratio thereof is controlled to a desired value regardless of the feedback signal from the air/fuel ratio sensor 48 at the fully closed position of the throttle valve 24. The delay circuit 86 delays a time D the change between the first and second modes of fuel-/air ratio control operation of the fuel injection control circuit 72. The reason for this is that the air/fuel ratio sensor 48 continuously provides a correct feedback signal to the fuel injection control circuit 72 during a period of time between the start of opening of the air valve 40 and the arrival of the introduced air at the air/fuel ratio sensor 48, while it continuously provides an incorrect feedback signal to the fuel injection control circuit 72 a time after the start of closing of the air valve 40.

Referring to FIG. 5, there is illustrated an alternative embodiment of the present invention, which is substantially similar to the first embodiment of FIGS. 2 and 3 except that the throttle position switch 26 is eliminated and replaced with a load sensor 100 adapted to provide a low signal at low loads and a high signal when the engine load exceeds a given extremely low value. The output of the load sensor 100 is coupled to one input of the AND circuit 84 and also coupled to the input of the inverter 88. The operation of this embodiment is identical with that of the first embodiment and will not be described further.

In view of the foregoing, it is apparent that there has been provided, in accordance with the present invention, an improved split type internal combustion engine which is stable in operation particularly during a split engine operation and high in fuel economy, engine output and exhaust gas purifying performance. If the throttle valve is fully closed during a split engine operation, air is introduced into the inactive cylinders to minimize the pumping losses therein and the fuel supplied to the active cylinders is controlled to a value sufficient for stable engine operation regardless of the feedback signal from the air/fuel ratio sensor. While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:
1. An internal combustion engine comprising:
(a) a plurality of cylinders split into first and second groups;
(b) first and second fuel injection means for supplying fuel into said first and second groups of cylinders, respectively;
(c) an air intake passage provided therein with an air metering throttle valve and divided downstream of said throttle valve into first and second branches for supplying air to said first and second groups of cylinders, respectively, said second intake passage branch provided near its inlet with a stop valve normally open to allow the flow of air into said second group of cylinders;
(d) an exhaust passage through which exhaust gases are discharged from said cylinders to the atmosphere;
(e) an EGR passage having its one end opening into said exhaust passage and the other end opening into said second intake passage branch, said EGR passage having therein an EGR valve normally closed to interrupt recirculation of exhaust gases into said second intake passage branch;
(f) an air introduction passage having its one end connected to an air source and the other end opening into said second intake passage branch, said air introduction passage having therein an air valve normally closed to interrupt the flow of air thereinto;
(g) an air/fuel ratio sensor for monitoring the air/fuel ratio at which said engine is operating;
(h) signal generating means for providing, in synchronism with rotation of said engine, a fuel injection signal to said first and second fuel injection means, said signal generating means adapted to operate normally in a first mode to determine the pulse width of the fuel injection signal in response to engine load and said air/fuel ratio sensor and in a second mode to determine the same independently of the output of said air/fuel ratio sensor;
(i) first means responsive to engine loads for providing a first signal and cutting off the fuel injection signal to said second fuel injection means when the engine load is below a predetermined value;
(j) a load sensor for providing a second signal when the engine load is below a predetermined value much lower than the value predetermined in said first means; and
(k) second means responsive to the first signal for closing said stop valve and opening said EGR valve and responsive to the first and second signal for closing said EGR valve and opening said air valve and for placing said signal generating means into its second mode of operation.

2. An internal combustion engine according to claim 1, wherein said load sensor is in the form of a throttle position switch adapted to provide the second signal when said throttle valve is at its fully closed position;

3. An internal combustion engine according to claim 1, wherein said load sensor is in the form of an engine speed switch adapted to provide the second signal when the speed of rotation of said engine is below a predetermined value.

4. A internal combustion engine according to claim 1, which further comprises delay means for delaying the change between the first and second modes of operation of said signal generating means.

5. An internal combustion engine according to claim 1, wherein said signal generating means generates a fuel injection signal of a predetermined pulse width in its second mode of operation.

6. An internal combustion engine according to claim 1, wherein said air/fuel ratio sensor is in the form of an oxygen sensor located in said exhaust passge for monitoring the oxygen content of the exhaust gases flowing thereover to provide a signal indicative of the air/fuel ratio at which the engine is operating.

* * * * *